March 3, 1936. R. D. SHAW 2,032,597
AUTOMATIC LATHE
Filed April 11, 1933 3 Sheets-Sheet 1

INVENTOR
R. D. SHAW
BY Joseph W. Schofield
ATTORNEY

March 3, 1936.   R. D. SHAW   2,032,597
AUTOMATIC LATHE
Filed April 11, 1933   3 Sheets-Sheet 3

Fig. 3.

INVENTOR
BY R. D. Shaw
Joseph K. Schofield
ATTORNEY

Patented Mar. 3, 1936

2,032,597

UNITED STATES PATENT OFFICE 2,032,597

AUTOMATIC LATHE

Robert D. Shaw, Hartford, Conn., assignor to Pratt & Whitney Company, Hartford, Conn., a corporation of New Jersey Application April 11, 1933, Serial No. 665,566

25 Claims. (Cl. 82—21)

This improvement relates to a lathe having an automatic cycle of movements of the tool carrying slides, the movements being effected by rotating clutch magnets and arranged to follow each other in predetermined succession from an initial position through the cycle of movements and back to the initial position, the succession of movements being automatically controlled by slide operated switches and means being provided to start the cycle of movements.

Prior devices are well-known wherein magnetic clutches are utilized for effecting motions of various slides, relative to the work, but in these prior machines the motions are simply repeated continuously during the operation of the machine.

Similarly, early forms of engraving machines have shown magnetic clutches operating direct and reverse feeds repeated continuously with step by step feed at each reverse of the longitudinal feed. But, obviously, in machines of this type the movements of the slides do not follow a predetermined cycle for repeating certain operations on similar pieces of work successively mounted in the machine.

The forward and return movements of the tool carrying carriages or slides, in the present improvement, are preferably arranged to be effected by magnetic clutches mounted in two groups and acting upon lead screws as feed shafts, one group being for the forward movements and the other group for the return movements, the latter group being preferably operated at a higher speed for rapid return of slides back to initial position after completion of the cycle.

There is a variety of types of lathe work that can be done on an automatic lathe of this character, such as pistons, valves, shoulder shafts and the like, where duplicates are required to be finished or turned to the same dimensions. Hence the primary object of the present improvement is to provide a lathe which, by having an automatic cycle of movements, is arranged to perform successive operations on a piece of work, so that duplicate pieces may be successively mounted, in the lathe and finished in the same way by repeating the same cycle of movements, the movements of the cycle following automatically one after the other when the cycle is started.

For this purpose, it is preferable to arrange movements so that the forward movements of the slides move the tool into position for operation on the work and during the cutting operation and it is also preferable that the forward movements should be at normal cutting speeds, while the return movements of the slides back to their initial or starting positions may be by rapid traverse, so as to shorten the period of the cycle.

The movements of the respective slides are preferably effected by magnetic clutches, the magnets of which are operated at a suitable voltage and the cycle of movements of the slides is governed by the slides themselves operated in succession by switches in lower voltage circuits operating relays controlling energization of the magnetic clutches.

One group of magnetic clutches, as previously indicated, is utilized for rapid traverse return movements of the respective slides back to their initial or starting positions. In order to stop these return movements at their initial positions, limit switches operated by the respective slides are provided so that the operating circuits of the rapid traverse clutches are opened without the intervention of relays, such as are used for initiating the successive movements of the cycle.

When a piece of work is completed, the slides are all returned to initial positions, then the finished piece may be removed from the lathe and another piece to be similarly finished inserted. An important feature of the present improvement is the provision of a suitable manual switch operating relays and control switches for starting the cycle of motions and arranging the circuits for completion of the cycle of movements automatically.

These and other features of the improvement are more particularly described in connection with the accompanying drawings, wherein.

Referring more in detail to the drawings, it will be seen that the lathe bed is supported on a base frame 1 and is provided with slide ways 2 and 3, at one end of which the headstock 4 is mounted, the headstock being provided with bearings for the spindle 5 for supporting and rotating the work. The spindle 5 is provided with any suitable face plate 6 and center 7 for supporting and rotating the work and on the opposite end of the lathe bed the usual tailstock and center may be mounted, but for clearness these are not shown in the present drawings. Obviously, the usual chuck may be mounted on the spindle 5 for supporting the work when a chuck will serve the purpose.

Figure 1:
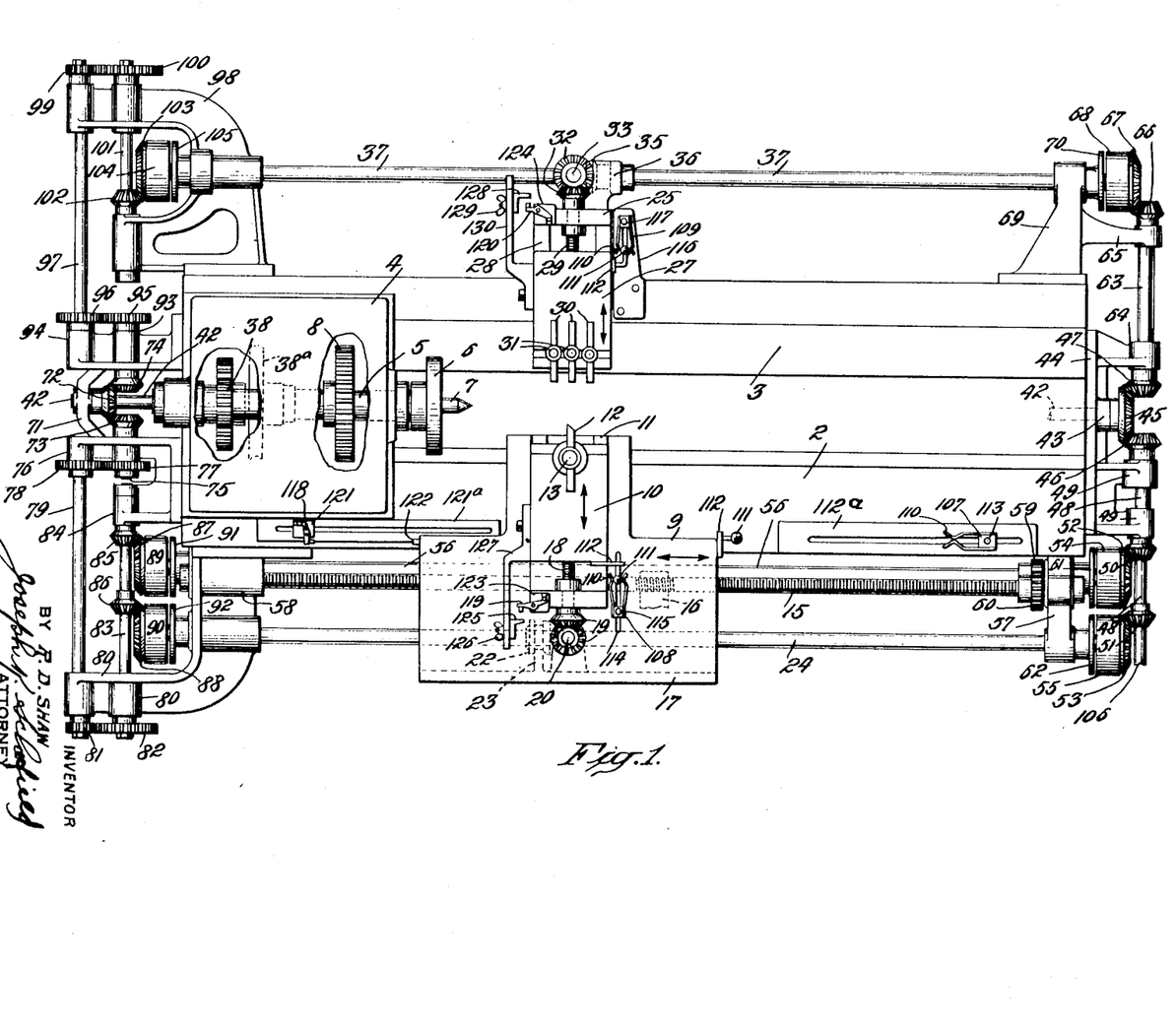
Fig. 1 shows a plan view of the improved automatic lathe.

The spindle 5 may be rotated in the usual or any preferred manner, such as a motor or other power applied through the gear 8, secured to the spindle 5, substantially as indicated in Fig. 1. The usual carriage or main slide 9 is mounted at the front of the lathe on the slide way 2 for longitudinal movement along the bed parallel to the axis of the spindle. A tool carrying cross slide 10 is mounted on suitable ways on the carriage or main slide 9, for movement transversely thereof toward and from the axis of the work carried by the spindle. One or more tools 12 may be mounted on the cross slide 10 by the usual clamping means 13.

The construction of the above described parts is or may be such as usually employed, the drawings showing but one conventional embodiment.

Figure 2:
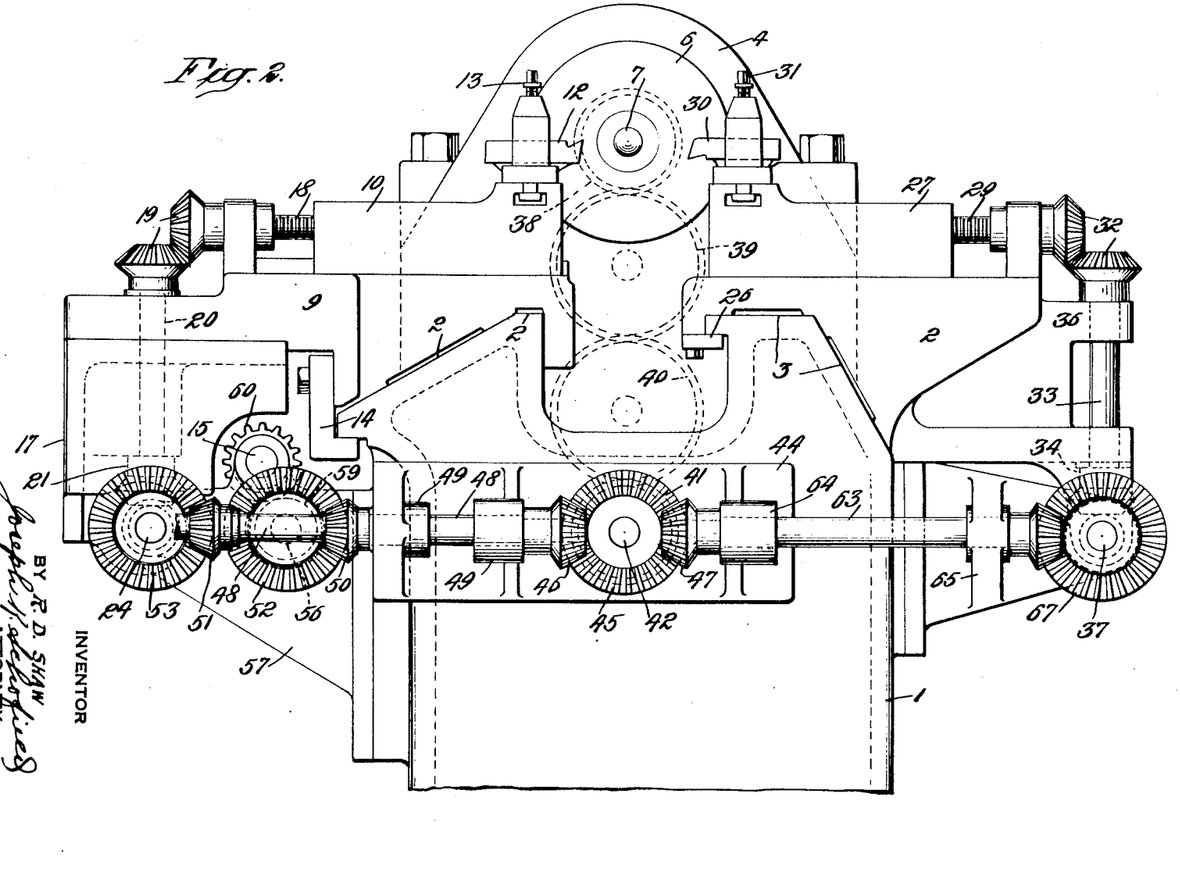
Fig. 2 is an end view looking from the right in Fig. 1

As will be seen in Figs. 1 and 2, the main slide 9 is held to the bed of the lathe by a suitable clamping strip 14 and may be moved longitudinally of the bed by a lead screw 15 engaging a nut 16 carried by the apron 17 of the carriage or main slide 9. The cross slide 10 is likewise adapted to be moved transversely of the main slide 9 by a screw 18, preferably adapted to be rotated by bevel gears 19, gearing it to a vertical shaft 20 supported in the apron 17 of the main slide 9. The shaft 20 is provided at its lower end with a bevel gear 21 meshing with a corresponding gear 22 held for rotation in a fixed fork 23 formed as part of the apron 17, or otherwise secured thereto, the bevel gear 22 being splined to and slidable longitudinally of a splined shaft 24, as the main slide 9 is moved by the screw 15. With this construction, it will be seen that the position of the cross slide 10 may be adjusted transversely of the main slide 9 in any longitudinal position of the latter by rotating the splined shaft 24.

At the rear of the lathe on the slide way 3, another longitudinally adjustable slide bracket 25 is mounted and held in place by a clamping strip 26, this slide preferably being positioned by hand along the bed of the lathe, but obviously, the usual screw feed may be provided if desired (not shown).

A rear tool carrying cross slide 27 is mounted on ways 28 on the bracket slide 25 and is movable transversely thereof by a lead screw 29, as will be seen in Figs. 1 and 2. The cross slide 27 is provided with tool carrying means and may carry one or more tools 30 secured thereto, in the usual manner by clamp bolts 31. The rear tools should be and are shown inverted, as in Fig. 2, so as to properly engage the work.

The lead screw 29 for the rear cross slide 27 is also adapted to be rotated by bevel gears 32 connecting it with a vertical shaft 33 mounted at the rear of the slide bracket 25. The shaft 33 is provided at its lower end with a bevel pinion 34 meshing with a corresponding bevel pinion 35, held for rotation in fixed relation to the slide 25, by a yoke or bearing 36, but keyed to and slidably mounted on a splined shaft 37, so that the lead screw 29 may be rotated with the supporting bracket 25 in any longitudinal position of adjustment.

In the present improvement the movements of the various slides 9, 10 and 27 are arranged to be started and stopped by energizing and deenergizing magnetic clutches and preferably the clutch magnets are rotated constantly at appropriate speeds relative to that of the spindle 5. Accordingly, in the present instance, the spindle 5 may be provided with a pinion 38, meshing with a gear 39, which meshes with a gear 40, both suitably supported on a frame 38a. The gear 40 (Fig. 2) meshes with a pinion 41 secured to a shaft 42 extending longitudinally of the lathe bed (shown broken away in Fig. 1). The right end of the shaft 42 is supported in a bearing 43 in a bracket 44 mounted on the right end of the lathe bed and adjacent this bearing the end of the shaft 42 carries a bevel gear 45 meshing with two similar diametrically disposed bevel pinions 46 and 47. The bevel pinion 46 is mounted on the end of a forwardly extending shaft 48 supported in bearings 49 formed as part of the bracket 44, the shaft 48 being provided with two bevel pinions 50 and 51 meshing, as will be seen in Fig. 1, with bevel gears 52 and 53, mounted upon clutch magnets 54 and 55, suitably mounted for continuous rotation as the spindle 5 is rotated.

The clutch magnet 54 (rotated by pinion 50) is rotatably mounted upon the end of an auxiliary shaft 56 extending longitudinally of the lathe at the front thereof and rotatably supported in a bracket 57 at its right end and in a bracket 58 at its left end, as will be seen in Fig. 1. It will be noted that in order to have the magnetic clutches 54 and 55 in the same line so as to operate them from the same shaft 48, the shaft 56 is mounted below the main slide lead screw 15 and the latter is connected to the shaft 56 by means of two spur gears 59 and 60 (at the left in Fig. 1), connected respectively to the shaft 56 and the left end of the screw 15, so that the screw 15 may be rotated by rotating the shaft 56 from either end.

The right end of the shaft 56 carries a clutch armature disc 61 for cooperation with the clutch magnet 54, the clutch disc being slidably splined to the shaft 56, so that the latter may be rotated when the clutch magnet is energized. Similarly the right end of the splined shaft 24, for rotating the cross slide lead screw 18, is provided with a clutch armature disc 62 slidably splined on the end thereof so that by energization of clutch magnet 55 the shaft 24 may be rotated for effecting return movement of the front cross slide 10.

Bevel pinion 47, meshing with the gear 45, is mounted on the end of a shaft 63, extending toward the rear and supported in bearings 64 and 65. The shaft 63 carries at its rear end a bevel pinion 66, meshing with a bevel gear 67, secured to a clutch magnet 68 rotatably mounted on the end of the spline shaft 37, as will be seen in Fig. 1. The right end of the shaft 37 is rotatably supported in a bearing bracket 69 (which supports bearing 65) secured to the rear of the lathe bed, adjacent the bearing in 69, the shaft 37 carries a clutch armature disc 70 slidably splined on the shaft for rotating the latter by cooperation with the clutch magnet 68, when the latter is energized. By this means, it will be understood that the rear cross slide 37 may be operated (for rapid traverse return movements as explained later) by rotation of the lead screw 29.

The left end of the longitudinally extending shaft 42 is supported in a suitable bearing bracket 71 and carries adjacent thereto a bevel pinion 72 meshing with oppositely rotated bevel pinions 73 and 74, so that these pinions are rotated in unison with the work spindle 5. The front bevel pinion 73 is secured to the end of a short shaft 75 rotatably mounted in a bearing bracket 76 secured to the left end of the lathe bed. As will be seen in Fig. 1, this shaft 75 carries a spur gear 77 meshing with a similar gear 78 mounted on a shaft 79 having a bearing in the bracket 76 and extending forward through a bearing in a bracket arm 80, shown as part of the bracket 58, previously referred to as supporting the left ends of the shaft 56 and screw 15. This same bracket also supports the left end of the shaft 24 as will be seen in Fig. 1.

The shaft 79 carries at its front end a change gear pinion 81 meshing with a change gear 82 mounted on the end of a shaft 83, extending parallel with the shaft 79 and rotatably supported in the bracket 80 and a bearing lug 84 formed as part of the bracket 76. It will be understood that with the gears 81 and 82 interchangeable with other gears having different ratios the relative speed of rotation of the shafts 79 and 83 may be varied.

As will be seen in Fig. 1, the shaft 83 has mounted thereon two bevel pinions 85 and 86 meshing respectively with bevel gears 87 and 88 secured to clutch magnets 89 and 90, which are accordingly rotated in the opposite direction from the corresponding clutches 54 and 55. The clutch magnet 89 is rotatably mounted on the left end of the shaft 56 in position to cooperate with a clutch armature 91 slidably splined on the left end of the shaft 56 so that the latter will be rotated to move the carriage or main slide 9 to the left or for forward movements when the clutch magnet 89 is energized. Similarly the clutch magnet 90 is rotatably mounted upon the left end of the splined shaft 24 for cooperation with a clutch armature 92 slidably splined on the left end of the shaft 24 so that the shaft 24 may be rotated when the clutch magnet 90 is energized for forward or inward movements of the front cross slide 10.

The rear bevel gear 74, which as previously described, meshes with the driven bevel gear 72 on the left end of the shaft 42, is mounted on a short shaft 93 rotatably mounted in a bearing bracket 94 and carries on its rear end a spur gear 95 meshing with a similar gear 96 mounted on a shaft 97. One end of shaft 97 has a bearing in the bracket 94 and the other end in a curved bracket 98 extending rearwardly from the lathe bed. The rear end of the shaft 97 is connected by change gears 99 and 100 with a parallel shaft 101 also rotatably mounted in the bracket 98. The shaft 101 is provided with a bevel pinion 102, meshing with a bevel gear 103, secured to a clutch magnet 104 rotatably mounted on the left end of the rear feed shaft 37, as will be seen in Fig. 1. The clutch magnet 104 is adapted to cooperate with a clutch armature 105 slidably splined to the end of the shaft 37, so as to cooperate with the clutch magnet 104 and rotaate the shaft 37 when the magnet is energized.

From the described gearing arrangement, it will be seen that the spindle 5 and the various clutch magnets (89, 90, 104; 54, 55, 68) for the movements of the carriage and slides are rotated in unison by the power applied to the spindle through the gear 8. The entire train of gears, including the clutch magnets and spindle, may be rotated by independent driving means attached at 106 to the end of the shaft 48. By tracing the gearing connections, it will be seen that the main slide or carriage 9 is moved toward the left, during the cutting operation by the magnetic clutch 89, and for rapid traverse toward the right, for return movements, by the clutch magnet 54. It will also be seen that the forward movement of the front cross slide 10 is effected by magnetic clutch 90 operating the splined shaft 24, and the return movement to initial position is effected by the clutch magnet 55 rotating at higher speed. Similarly, the shaft 37 is rotated for the forward movements of the rear slide 27 by the clutch magnet 104, and for return movements by the high speed clutch magnet 68. It will also be understood that by means of the change speed gears 81—82 and 99—100 the relative speeds of rotation of the clutches 89, 90 and 104 for the forward movements may be varied according to requirements.

Figure 3:
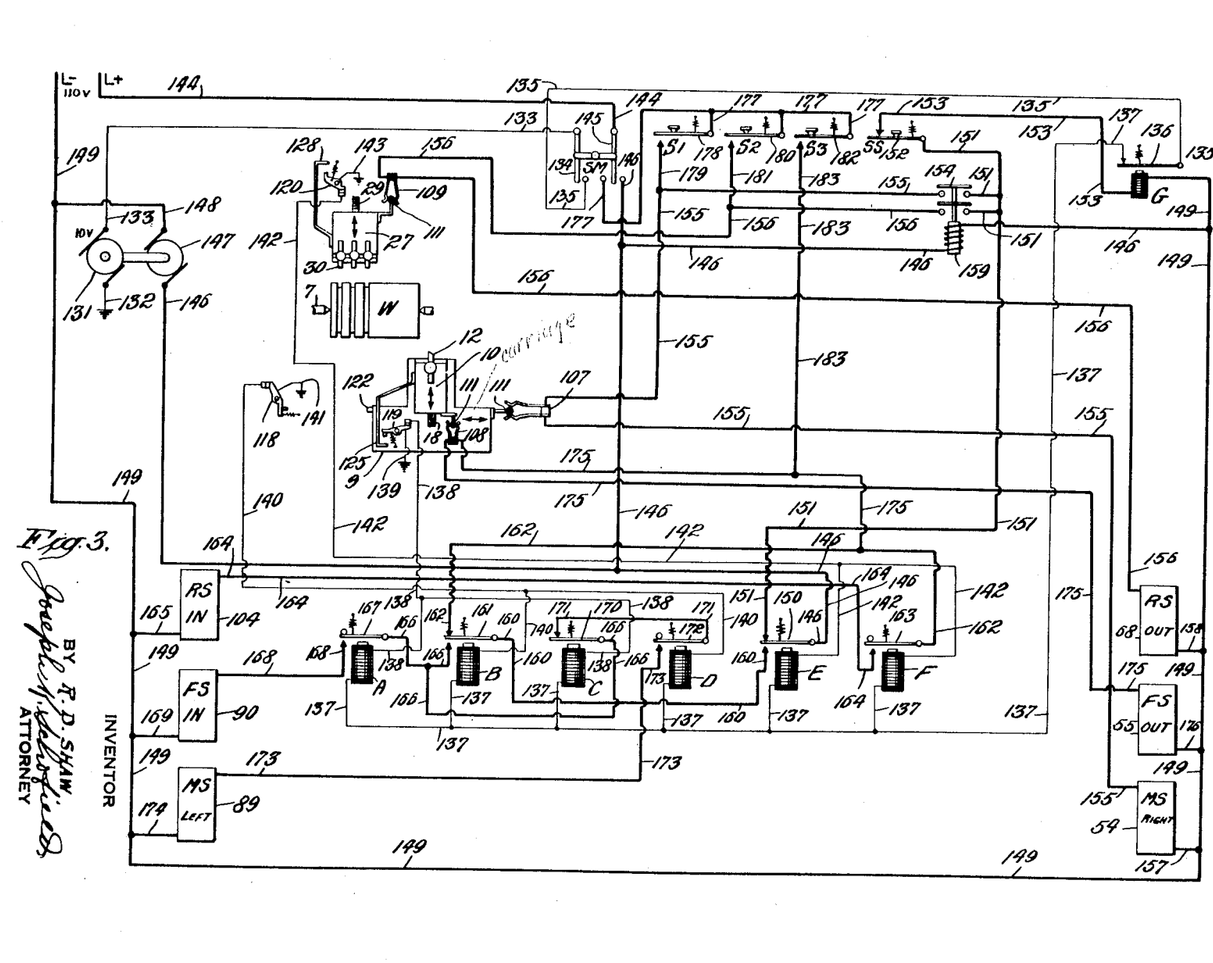
Fig. 3 is a wiring diagram of the circuits shown with certain operating parts of the lathe.

For energizing the respective clutch magnets, various circuits are provided as more particularly shown in Fig. 3, and through suitable relays and auxiliary circuits, automatic control of the succession of movements of the various slides is predetermined by switches operated by movement of the respective slides.

Preferably two types of switches are used; one type being referred to as limit switches 107, 108 and 109, which comprise spring contact terminals normally arranged with sufficient resiliency to close the circuit, but provided with outwardly flaring ends 110, so that the circuit may be broken by the entrance between the spring members of a bar or operating member 111 of insulating material, projecting from a bracket 112 carried by the respective slides 9, 10, and 27. In Fig. 1 the limit switch contact terminals 107 are shown in closed position (insulating bar 111 withdrawn) and those of 108 and 109 in open position.

The limit switches just described (107, 108, 109) determine the initial positions of the respective slides and therefore limit their return movements; and since the clutch magnets are preferably operated on 110 volt circuits, these limit switches are arranged directly in the circuits of the respective clutch magnets for rapid traverse return movements so that when the slides return to their starting or initial positions, the corresponding clutch magnets are de-energized to stop the movements.

Obviously, it may be desirable at times to vary the initial or starting positions of the respective slides and accordingly, the limit switch 107 is mounted on a slotted bracket 112a so that by means of a suitable clamping screw 113 its position longitudinally of the lathe bed may be adjusted. Similarly, the limit switch 108 is mounted for adjustment relative to the cross slide 10 by means of a slot 114 and clamping screw 115, as indicated in Fig. 1. The rear slide limit switch 109 is likewise adjustably mounted on a slotted bracket 116 and may be clamped after adjustment by a suitable screw at 117 so that the return limit or initial position of the slide 27 may be varied.

For stopping the forward movements and initiating the succession of movements of the slides, as will be more fully described later, the respective slides operate contact lever switches 118, 119 and 120 for controlling relays, preferably operating low voltage auxiliary circuits. The contact switches are mounted to be operated by the respective slides at the ends of their forward movements; for instance, the contact lever switch 118 is mounted on a supporting block 121, so as to be in position to be operated by a lug or projection 122 carried by the carriage or main slide 9. The contact lever 118 is adjustable relative to carriage 9 by sliding the block 121 along a slot in the plate 121a. The contact lever switch 119 is preferably mounted at 123 on the slide 9, in fixed relation to the cross slide 10. The contact lever switch 120 is likewise mounted at 124 on the bracket 25 in fixed relation to the rear cross slide 27. The contact switch 119 is adapted to be opened at the end of the forward movement of the front cross slide 10, by a finger or lug 125 adapted to be adjustably clamped by a screw nut 126 on a bracket 127 secured to the slide 10, as shown in Fig. 1. A similar actuating lug 128 is adapted to open the contact switch 120, the lug 128 being adjustable and clamped by wing nut 129 to a bracket 130 secured to the side of the rear cross slide 27. The relative adjustment between the actuating lugs and the corresponding contact lever switches may be obtained by any other well-known means and any of the well-known micrometer or screw adjustments may be employed for close setting.

The various movements of the slides during a cycle are arranged to follow each other in predetermined succession and these movements are preferably controlled by relays and circuits substantially as shown in the wiring diagram, Fig. 3. In the present arrangement there are six relays A, B, C, D, E and F, the operation of which for starting the cycle is controlled through a starting relay G. All of the relays except the starting relay G are preferably operated by low voltage current from a motor generator 131, one side of which is grounded at 132. The circuit 133 from the low voltage generator passes to a switch arm 134, and when the switch is closed the current passes to circuit 135 which is connected to the armature 136 of the starting relay G. This armature 136, when the relay G is not actuated, is held against a contact to the circuit 137, which passes through the respective magnets of the relays A, B, C, D, E and F, the magnet circuits being completed to ground through the respective slide operated lever contacts 118, 119 and 120.

From the relays A and C, the circuit 138 passes to the contact of lever contact switch 119 and then to ground at 139. The circuits of the relays B and D are completed to ground through the circuit 140 to the contact of lever contact switch 118 and then to ground 141. The circuits of the magnets of relays E and F are completed to ground through circuit 142 to the contact of lever contact switch 120 and then to ground at 143.

The clutch magnets (54, 55, 68, 89, 90, 104) are preferably energized by relatively high voltage current and the main line plus circuit line is indicated at 144, which passes to the arm 145 of the main double arm switch SM and when this switch is thrown to the right, the plus side 144 of the line circuit is completed to circuit 146, which, it will be seen, divides, one part going to the motor 147 of the motor generator and thence by circuit 148 to the negative side 149 of the main line 110 volt circuit.

Another part of the plus circuit 146 goes to the armature 150 of relay E which when not energized (armature up as shown in Fig. 3) closes on circuit 151, which is connected to the switch arm 152 of starting switch SS. The starting switch SS is normally closed on circuit 153, which, it will be seen, passes through the magnet of the starting relay G and then to the negative side of the main line circuit 149.

Two branch circuits of circuit 151 pass to contacts of a two arm contactor or automatic switch 154 through which they connect with circuits 155 and 156, the circuit 155 passing through the main slide limit switch 107 and then to the main slide return clutch magnet 54 (MS Rgt) and by 157 to the negative side of the main line circuit 149.

The circuit 156 passes to the rear slide limit switch 109 and then to the rear slide return clutch magnet 68 (RS Out) and from there by 158 to the negative side of the main line circuit 149.

It will be seen that the automatic double contactor 154 is operated by a branch of the positive main line circuit 146 which passes through an operating coil 159 and then to the negative circuit 149. Going back to relay E, it will be seen that if the armature 150 is drawn down by actuation of the magnet, the positive circuit 146 is carried through to circuit 160, which is connected to the armature 161 of the relay B and from the armature 161 when in normal position the circuit is closed to circuit 162 which is connected with armature 163 of relay F. When relay F is energized, the armature 163 closes on circuit 164, which passes to the in feed rear clutch magnet 104 (RS In) and thence through 165 to the negative side 149 of the main line circuit.

When the armature 161 of relay B is drawn down by operation of the relay, the circuit 160 closes through to circuit 166, which is divided, one part going to the armature 167 of relay A and when this armature 167 is drawn down, it closes on circuit 168 to the clutch magnet 90 (FS In) for in feed of the front cross slide, and from there through 169 to the negative side 149 of the main line circuit. The other part of circuit 166 passes to armature 170 of relay C, this armature 170, in normal up position, with the relay magnet deenergized closes to circuit 171 which goes to armature 172 of relay magnet D and thence, when the relay D is energized, to circuit 173, the latter going to the main slide clutch magnet 89 (MS Lft) and from there by 174 to the negative side 149 of the circuit.

Going back to the circuit 162 from relay B to relay F, it will be seen that this circuit is divided and a part 175 passes through the limit switch 108 and thence to the front slide return clutch magnet 55 (FS Out) and from there through 176 to the negative side of the circuit.

If the arm 145 of the main line switch SM is thrown to the left, the positive main line circuit 144 is connected to circuit 177, which by suitable branches is connected with three switches S1, S2 and S3 normally open as indicated in Fig. 3. When the S1 switch arm 178 is closed the circuit 177 is connected to circuit 179 which joins with circuit 155 going through the limit switch 107 to clutch magnet 54 and then through 157 to the negative side of the circuit 149.

When the contact lever 180 of switch S2 is closed, the circuit 177 is completed to circuit 181, which, as will be seen, is connected by circuit 156 going through limit switch 109 to the rear return clutch magnet 68 and then to the negative side 149.

When the contact arm 182 of switch S3 is closed, the positive circuit 177 closes to circuit 183 which joins circuit 175, the latter passing through limit switch 108 and then to the front slide return clutch magnet 55 and from there to the negative side 149 of the line circuit.

The operation may be described as follows in connection with Fig. 3, the various elements being there shown substantially in normal idle positions. The first step is to close the main switch SM so that the L plus 110 volt circuit 144 is completed to circuit 146 and the 10 volt circuit 133 from the generator 131 is closed on circuit 135. The circuit 146 to the motor 147 starts the latter, the circuit being completed directly to the minus side of the 110 volt circuit through 148, 149.

Another branch of the plus circuit 146 by passing through the coil 159 closes the double contact switch 154, this branch of the circuit 146 being connected directly to the minus side 149. The main division of the plus circuit 146, however, goes through armature 150 of relay E and then back to circuit 151, through switch arm 152, which, as previously indicated, is closed, and then by circuit 153 through the coil of relay G and to the negative side of the main line circuit 149. This energizes the starting relay G and draws down the armature 136 to break the circuit so that the low potential current starting in circuit 135 cannot pass to circuit 137 to energize or operate any of the relays A to F inclusive.

At this time it will be seen that the slides are in their initial positions, that is, the main slide 9 is at its starting position at the right; the front cross slide 10 is in its initial or full "out" position; and the rear slide 27 is in its "out" position, thus all of the limit switches 107, 108 and 109 are held open. With the slides all back, it will be understood that all of the lever contact switches 118, 119 and 120 are closed, so as to ground and complete the control relay circuits when the cycle is started.

The momentary starting switch lever 152 of the starting switch SS is now depressed, thus breaking the circuit 151—153 through the coil of relay G, thereby permitting the armature 136 of the relay to rise and close circuit 135 on circuit 137 so as to energize the series of relays A, B, C, D, E and F. The circuits 137 of the several relays are completed through circuits 138 and ground 139; circuit 140 and ground 141; circuit 142 and ground 143. The relay armatures are thereby all drawn down and the circuit 146 through the armature 150 to circuit 151 is broken so that the starting key SS may be released without energizing relay G, and current in circuit 146 through armature 150 is carried to circuit 160, which going through armature 161 to the lower circuit 166 will carry the plus current to armature 167 and through circuits 168 to clutch magnet 90, marked FS In, the latter being the clutch magnet for in feed of the front cross slide, the circuit therethrough being completed by line 169 to the negative main line circuit 149.

The in movement of the front cross slide 10 will continue until the lever contact 119 is broken by the tappet lug 125, whereby the ground circuit 138, 139 will then be broken and the armatures of relays A and C will be released and restored to normal up positions. The circuit 168 to the clutch magnet 90 being thus broken, the in movement of the slide 10 will be stopped with the tool in position for making the cut on the work W and this will be effected by forward movement, that is, movement to the left by the main slide 9. Now tracing the plus current through circuit 160 and through armature 161, which is down, to circuit 166, it will be seen that the latter is connected with armature 170 of relay C, the magnet of which has been de-energized so that the relay armature 170 being up closes on circuit 171 carrying the positive current to armature 172, which is down, and by circuit 173 to the clutch magnet 89, which is marked MS Left, and thence by lead 174 to the negative side 149 of the main line circuit. Left feed movement of the main carriage or slide 9 is, therefore, effected and the tool 12 is moved longitudinally for operation on the work W.

Left or forward movement of the main slide 9 will continue until the stud 122 engages the contact lever 118 and breaks the circuit between circuit 140 and ground 141, thus de-energizing the magnets of relays B and D. This allows the armatures 161 and 172 to return to normal up positions and the circuit 173 to clutch 89 will be broken so that left movement of the main slide 9 is stopped. At the same time the armature 161 of relay B, by being drawn up, closes the circuit 160 to circuit 162, which carries the plus current through armature 163 of relay F to circuit 164 and thence to clutch magnet 104, marked RS In, which will operate the rear slide 27 for in movement, the circuit being completed through lead 165 to the negative side 149.

At the same time, it will be seen that through a branch of the circuit 162 plus current passes to circuit 175 and through limit switch 108, which is closed because the cross slide 10 is in its forward position, and since circuit 175 passes to clutch magnet 55, which is marked FS Out, this magnet is energized, thus bringing into action the rapid traverse magnet for returning the front slide 10 to initial out position at high speed. The circuit 175 is completed through 176 to the negative side 149 as previously indicated. As soon as the front slide 10 reaches initial position, the limit switch 108 will be opened by the bar 111, thus stopping the return movement of the slide.

Incidentally, it should be noted that when the front slide 10 is returned to its initial position, the lever contact switch 119 is again closed, but owing to the fact that the 110 volt circuits are broken at other points the main line circuits will not be again closed. The rear slide will continue its in movement by energization of clutch magnet 104—RS In until the trip arm 128 engages the contact lever 120 and breaks the ground circuit 142, 143, thus de-energizing the magnets of relays E and F, so that the respective armatures 150 and 163 thereof will return to normal up positions.

The lifting of armature 163 breaks the circuit 164 to the RS In clutch magnet 104, thus stopping the in movement of the rear slide. At the same time, the armature 150 of relay E is lifted to close the plus circuit 146 to circuit 151 and through double contactor 154 to circuits 155 and 156. The circuit 155, it will be seen, passes through limit switch 107, which is closed because the main slide 9 is at the extreme left with contact switch 118 open. The current in circuit 155 will then energize the rapid traverse clutch magnet 54, marked MS Right, for high speed return movement of the main carriage or slide 9. As soon as the main slide 9 reaches its initial or starting position, the switch bar 111 by entering the limit switch 107 will break the circuit 155 and stop the return movement of the main slide.

The current in circuit 156, passing through limit switch 109, the latter being closed since the rear slide 27 is in its forward position, will energize clutch magnet 68 marked RS Out, and thus return the slide 27 to its initial position at relatively high speed or by rapid traverse. As soon as the rear slide 27 reaches its initial position, the switch bar 111 thereon will open the limit switch 109 and de-energize clutch magnet 68 to stop the return movement.

The cycle of movements is now completed and the slides 9, 10 and 27 are all back in their initial or starting positions ready for another cycle. The operator now takes out the finished piece of work and inserts another piece of the same character to be finished, then, by again depressing the starting switch SS, the cycle is repeated automatically, and may be repeated without further attention from the operator, except to remove finished pieces and insert new pieces.

If at any time it becomes necessary to return the slides to their initial positions before the completion of a cycle of movements, the main switch SM is thrown to the left, thus cutting out the low potential circuit 135 and carrying the current in the L plus circuit 144 to circuit 177. Cutting out circuit 146 stops the motor generator and releases the contactor switch 154 and de-energizes the magnet of starting relay G, but there is no low potential current so the relays A, B, C, D, E and F are idle.

Now if it is desired to return the main slide 9 to its initial position, the key bar 178 of switch S1 is depressed, closing circuit 177 to 179 and the current passing through circuit 155 will energize the rapid traverse return magnet 54 and thus bring the main slide 9 back to its initial position, at which time the switch bar 111 will open the limit switch 107.

Similarly the rear slide 27 may be returned to its initial position by depression of the key bar 180 of switch S2, thereby closing circuit 177 on 181 and thus directing the current by circuit 156 to the rapid traverse return clutch magnet 68, RS Out, return movement of the slide 27 continuing until the circuit is broken by the bar 111 of slide 27 opening the limit switch 109.

Likewise by depressing the key 182 of switch S3, the circuit 177 is closed on 183 which directs the current through circuit 175 to energize the rapid traverse return clutch magnet 55 (FS Out) to return the front slide 10 to its starting position. When the front slide 10 reaches its initial position, the switch bar 111 thereon opens the limit switch 108 and by breaking the circuit 175, stops the return movement.

In the present improvement, no specific means is provided for cutting out one or more of the slide movements of a cycle, although it will be understood that such an arrangement may be provided. In the present device, however, if it is desired to temporarily eliminate one of the slides, for instance operative movement of the rear slide, this can be done by a close adjustment between the front and rear limit switches 109 and 120, so that the in movement of the slide is very slight and as soon as the slide returns to its initial position, its movement is stopped in the usual way by opening the limit switch 109.

While a preferred form of the improvement has been shown and described, it will be understood that the electrical control through prearranged cycles of movements for various slides may be arranged for different varieties of tools and controlled in substantially the same way without departing from the spirit and scope of the invention.

What I claim is:

1. A lathe comprising in combination, a bed, a rotatable work spindle, a carriage movable longitudinally on the bed, a tool supporting cross slide movable transversely on said carriage, clutch magnets for effecting forward and return movements of the carriage and slide respectively, circuits for energizing the clutch magnets, and switches operated respectively by said carriage and cross slide to determine the ends of their forward and return movements and thereby control energization of the magnets to control said movements whereby movements of the carriage and cross slide from and back to initial positions follow in a definite sequence.

2. A lathe comprising in combination, a bed, a rotatable work spindle, a carriage movable longitudinally on the bed, a tool supporting cross slide movable transversely on said carriage, clutch magnets for effecting forward and return movements of the carriage and cross slide respectively, circuits for energizing the respective clutch magnets, relays for controlling operation of the circuits of said magnets, auxiliary circuits for operating said relays, switches arranged to be operated by said carriage and cross slide to determine the ends of their forward and return movements and thereby control operation of the circuits of the relays and magnets to control movements of the carriage and cross slide whereby movements from and back to initial position follow in succession according to a definite sequence.

3. A lathe comprising in combination, a bed, a rotatable work spindle, a carriage movable longitudinally on the bed, a tool supporting cross slide movable transversely on the carriage, clutch magnets for effecting forward and return movements of the carriage and cross slide respectively, means for rotating said spindle and the clutch magnets continuously, circuits for energizing the clutch magnets for effecting movements of the carriage and cross slide, relays for controlling operation of the circuits of said magnets, auxiliary circuits for controlling operation of said relays, switches operated by said carriage and cross slide to determine the ends of their forward movements and thereby control operation of said relays and at the ends of their return movements to determine opening of the respective circuits of the return movement clutch magnets.

4. A lathe comprising in combination, a bed, a rotatable work spindle, a carriage movable longitudinally on the bed, a tool supporting cross slide movable transversely on the carriage, clutch magnets for effecting forward and return movements of said carriage and slide respectively, circuits for energizing the clutch magnets, relays for controlling operation of said energizing circuits, auxiliary circuits for controlling operation of said relays, means for rotating said spindle and the clutch magnets continuously at prearranged relative speeds, switches operable by the carriage and cross slide at the ends of their forward movements to control said auxiliary circuits operating the relays, switches operable by said carriage and cross slide at the ends of their return movements to control the energizing circuits of the respective return clutch magnets whereby the respective switches are operated in predetermined sequence and movements of the carriage and cross slide from and back to initial positions follow in a definite sequence, and a manual switch for starting said cycle of movements.

5. A lathe comprising in combination, a bed, a rotatable work spindle, a carriage movable longitudinally on the bed, a tool supporting cross slide movable transversely on said carriage, clutch magnets for effecting forward and return movements of said carriage and cross slide respectively, means for simultaneously rotating said spindle and the clutch magnets, means for rotating the clutch magnets for forward movements of the carriage and cross slide at different speeds from the clutch magnets for the respective return movements, circuits for energizing said clutch magnets, adjustably mounted switches operated respectively by the carriage and cross slide at the ends of their forward movements to control energization of the clutch magnets whereby the forward and return movements of the carriage and slide follow in predetermined succession, and switches operated by the carriage and slide at the ends of their respective return movements for de-energizing the return movement clutch magnets to stop said carriage and slide at their initial positions whereby movements of the carriage and cross slide from and back to their initial positions follow a definite sequence.

6. An automatic lathe comprising in combination, a spindle for rotating the work, a carriage for moving the tool relative to the work, a magnetic clutch for forward movements of said carriage from an initial position to an adjustable predetermined position, a magnetic clutch for effecting return motions of the carriage to the initial position after completing the cut, circuits for operating said clutches, switches operated by said carriage at the ends of the forward and return movements for controlling operation of said magnetic clutches, the return movement switch determining the initial position of the carriage whereby the carriage automatically follows a succession of movements from an initial position forward and then back to the initial position, and means controlled by a manual switch for starting said movements from the initial position.

7. An automatic lathe comprising in combination, a spindle for rotating the work, a carriage having a tool supporting cross slide, magnetic clutches for effecting forward movements of said carriage and the cross slide from initial positions, magnetic clutches for return movements of said carriage and cross slide to their respective initial positions after the forward motions are completed, circuits for effecting energization of the respective clutches, and switches operated by the cross slide and carriage at the ends of their forward and return movements for controlling said circuits whereby movements of the carriage and cross slides follow a predetermined sequence from initial positions to adjustable predetermined positions and back to initial positions.

8. An automatic lathe comprising in combination, a spindle for rotating the work, a carriage movable relative to the work, a cross slide movable transversely on said carriage, clutch magnets for effecting forward and return movements of the carriage and cross slide, means for constantly rotating said clutch magnets, means for starting the movements of the carriage and cross slide in sequence from prearranged initial positions, means for controlling de-energization and energization of the respective clutch magnets in succession after the movements are started so that the respective forward and return movements follow each other in prearranged succession, and means for operating the clutch magnets for the forward movements at one speed and for the return movements at another speed.

9. An automatic lathe comprising in combination, a spindle for rotating the work, a carriage movable relatively to the work longitudinally of the spindle, a cross feed tool supporting slide movable transversely on said carriage, a tool carrying slide mounted at the rear of the work and movable transversely of the spindle, means for supporting said rear slide for operation at a predetermined position longitudinally of the work, rotatable clutch magnets for effecting forward and return movements on said carriage and the respective cross slides, circuits for energizing said clutch magnets and switches operated by said carriage and the respective cross slides at the ends of their forward and return movements for opening and closing the energizing circuits for said magnets whereby forward and return movements of the carriage and cross slides follow each other automatically in predetermined succession, and means for starting the cycle of movements.

10. An automatic lathe comprising in combination, a spindle for rotating the work, a tool supporting slide, a pair of clutch magnets rotating in opposite directions for effecting forward and return movement of said slide relative to the work, gearing connected with one of said clutch magnets for effecting forward movements of the slide at lower speed than the return movements, circuits for operating the respective magnetic clutches, and switches operated by the slide at the ends of its forward and return movements for controlling the energizing and de-energizing of the respective clutch magnets in succession, and a switch for starting said movements.

11. An automatic lathe comprising in combination, a spindle for rotating the work, a carriage movable longitudinally of the spindle, a tool carrying cross slide movable transversely on said carriage, a tool carrying cross slide mounted at the rear of the spindle and movable transversely of the work, lead screws for moving said carriage and cross slides respectively, magnetic clutches for operating the respective screws for forward and return movements of the carriage and said slides, means for energizing said magnetic clutches in succession so that the movements of said carriage and the slides follow in predetermined sequence, means for constantly rotating the clutch magnets, and intermediate gearing for rotating the clutch magnets for forward movements at a different speed from the clutch magnets for return movements.

12. An automatic lathe as in claim 11 wherein change gears are interposed in said gearing for changing the relative speeds of rotation of the clutch magnets for forward and return movements.

13. An automatic lathe as in claim 11 wherein said clutch magnets are energized by circuits controlled by switches adapted to be operated by the carriage and slides respectively at the ends of their forward and return movement, the switches operated by the forward movement controlling the succession of movements of the carriage and slides, and the switches operated by the return movements stopping the return movements.

14. An automatic lathe comprising in combination, a spindle for rotating the work, a carriage movable longitudinally of the spindle, a tool carrying cross slide movable transversely on said carriage, said carriage and cross slide being located at the front of the lathe, a tool carrying cross slide located at the rear of the lathe and movable transversely for operating on the work from the rear, clutch magnets mounted in two groups, one group effecting forward movements of said carriage and the respective slides for successive operations of the work, the other group effecting return movements of said carriage and slides to their respective initial positions, means for constantly rotating the clutch magnets, gearing connections for rotating the magnets of the group for forward movements at a lower speed than the magnets of the group for return movements whereby return movements of the carriage and slides to initial positions are at higher speeds, means for energizing and de-energizing said clutch magnets in succession under control of the respective carriage and slides so that their movements follow a predetermined cycle from initial positions and back to the initial positions.

15. An automatic lathe as in claim 14 wherein circuits are provided for operating the clutch magnets of both groups, the circuits of the magnets being controlled by relays operated from an independent circuit by switches operated by the carriage and slides at the ends of their forward movements for controlling the operation of said relays, so that the forward and return movements follow in predetermined sequence.

16. A lathe having an automatic cycle of operations comprising a spindle for rotating the work, tool carrying slides for operating on the work, magnetic clutches for forward and reverse movements of the respective slides, circuits for controlling the operation of said clutches, switches operated by the respective slides at the ends of their forward movements for de-energizing the magnetic clutch effecting that forward movement and initiating the succeeding movement of the cycle, switches operated by the slides at the ends of their return movements for de-energizing the clutches effecting the respective return movements, and means including a switch for starting the cycle of movements.

17. A lathe having an automatic cycle of movements as in claim 16 wherein the magnetic clutches for forward movements are geared to rotate at a speed different from those for the return movements.

18. A lathe having an automatic cycle of movements comprising a spindle for rotating the work, a plurality of tool carrying slides movable relatively to the work, a group of magnetic clutches for effecting forward movements of the respective slides, a group of magnetic clutches for effecting return movements of said slides, circuits for operating said magnetic clutches, a plurality of relays controlling operation of the clutch circuits so that in the cycle of movements the forward movements of the respective slides are brought into action in succession followed by the return movements in succession, and switches operated by the respective slides on their forward and return movements for controlling the operation of said relays and for stopping the motions of the respective slides as they reach the ends of their forward and return movements.

19. A lathe having an automatic cycle of movements as in claim 18 wherein means is provided for adjusting the positions of the slide operated switches to vary the initial positions of the slides and the length of the forward and return movements.

20. A lathe having an automatic cycle of movements as in claim 18 wherein the switches operated by the respective slides at the ends of their forward movements operate through circuits controlling the relays to effect operation of the motions in the predetermined cycle, and the switches operated by the slides at the ends of their return movements break the circuits of the respective return movement clutches.

21. In a machine tool having means for rotatably supporting a work piece, a longitudinally movable carriage, a transversely movable slide carrying a tool, an electric motor for operating the carriage longitudinally, electric means for controlling the application of power by said motor, an electric motor for operating the slide transversely, a switch for operating the slide motor upon the movement of the carriage to a predetermined limit, and a switch controlling said electric means for reversing the movement of the carriage by the movement of the slide.

22. In a machine tool having means for rotatably supporting a work piece, a longitudinally movable carriage, a transversely movable slide carrying a tool, an electric motor for operating the carriage longitudinally, electric means for controlling the application of power by said motor, an electric motor for operating the slide transversely, a switch for operating the slide motor upon the movement of the carriage to a predetermined limit, a switch controlling said electric means for reversing the movement of the carriage by the movement of the slide, and a third switch for rendering both motors inoperative upon the movement of the carriage to a predetermined position.

23. In a machine tool having means for rotatably supporting a work piece, a carriage slidable on the machine tool, a cross slide slidable on the carriage, means to limit the movement of the cross slide inwardly, a tool on said cross slide, an electric motor to move said carriage and cross slide longitudinally, electric means for controlling the application of power by said motor, a second electric motor for moving said cross slide transversely of the tool, a switch operated by the slide for controlling the carriage movement, a switch controlling said electric means operated by the carriage for controlling the slide movement, and a third switch for rendering both motors inoperative to move the carriage on the slide.

24. A lathe comprising in combination, a bed, a rotatable work spindle, a carriage movable longitudinally on the bed, a tool supporting cross slide movable transversely on said carriage, clutch magnets for effecting forward and return movements of the carriage, a clutch magnet for effecting movement of said cross slide in one direction, circuits for energizing the clutch magnets, and switches operated respectively by said carriage and cross slide to determine the ends of the forward and return movements of the carriage and the end of one movement of the cross slide, and thereby control energization of the magnets to control said movements whereby forward and return movements of the carriage and movement of the cross slide in one direction will follow in a definite sequence.

25. A lathe comprising in combination, a bed, a rotatable work spindle, a carriage movable longitudinally on the bed, a tool supporting cross slide movable transversely on said carriage, clutch magnets for effecting forward and return movements of the carriage, a clutch magnet for effecting movement of said cross slide in one direction, circuits for energizing the clutch magnets, relays for controlling operation of the circuits of said magnets, auxiliary circuits for operating said relays, and switches operated respectively by said carriage and cross slide to determine the ends of the forward and return movements of the carriage and the end of one movement of the cross slide, and thereby control operation of the circuits of the relays and magnets to control said movements whereby forward and return movements of the carriage and movement of the cross slide in one direction will follow in a definite sequence.

ROBERT D. SHAW.